Dec. 3, 1963   K. GROSSKOPF   3,112,999
CARBON MONOXIDE DETECTING DEVICE
Filed May 2, 1962
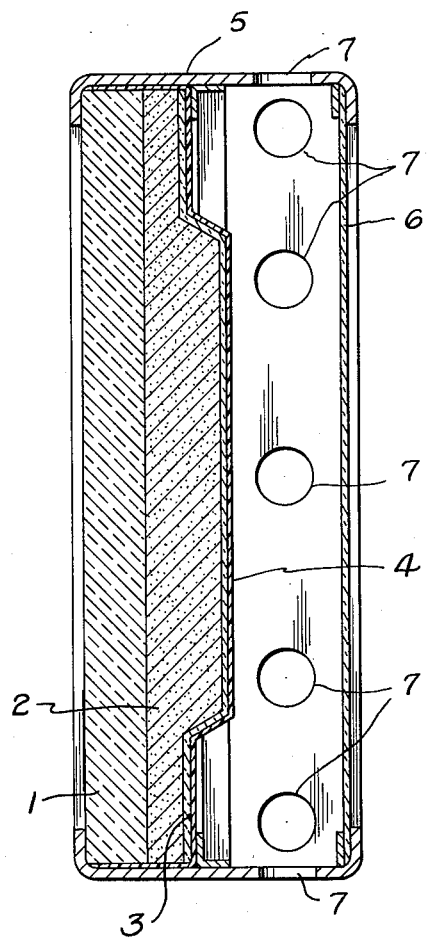
INVENTOR
*Karl Grosskopf*
BY *Bailey, Stephens & Huettig*
ATTORNEYS

United States Patent Office 3,112,999
Patented Dec. 3, 1963

3,112,999
CARBON MONOXIDE DETECTING DEVICE
Karl Grosskopf, Bad Schwartau, Germany, assignor to Otto Heinrich Dräger, Lubeck, Germany
Filed May 2, 1962, Ser. No. 191,804
Claims priority, application Germany May 15, 1961
1 Claim. (Cl. 23—254)

This invention relates to a device for the detection of noxious gases and, in particular, to the detection of carbon monoxide in air.

So-called reagent cards for determining the presence of carbon monoxide are well known. Such cards carry a reagent which changes color in the presence of carbon monoxide. The cards are either impregnated or coated with the reagent. However, these reagent cards have the disadvantage in that they are subject to changing atmospheric conditions, which means that undesirable side reactions may take place in accordance with strong atmospheric changes, and which would at least influence or falsify the indication given by the card. Moreover, the reagents ordinarily used are not stable and are not specifically for the detection of carbon monoxide alone. Thus they react to other reducible impurities in the air. Another disadvantage in these cards lies in that the reaction does not indicate the concentration of carbon monoxide in air. A low concentration of carbon monoxide taken over a long period of time is the same as a strong concentration of carbon monoxide taken for only a short period of time.

The object of this invention is to produce a device which does not have the disadvantages of the heretofore known detecting cards in determining the presence of carbon monoxide. According to this invention, the reagent is confined within a housing which is fully or at least partially permeable to carbon monoxide, and which is at least partially transparent. This arrangement has the advantage in that the housing protects the testing reagent to a great extent from changing atmospheric conditions, but does not prevent the entry of carbon monoxide to the reagent. This is especially advantageous as, for example, when the reagent is used to detect carbon monoxide in kitchen air. The structure of the instant invention keeps the reducible and usually highly molecular chemical mixtures contained in kitchen odors away from the reagent; while on the other hand, the carbon monoxide penetrates the permeable housing and reacts with the reagent. Another advantage lies in that very low concentrations of carbon monoxide do not penetrate the housing and that the reagent reacts only in the presence of high concentrations of carbon monoxide which are substantially enough to be detected. In one form of the invention, the reagent is contained on a flat surface absorbent body, with the body being covered on one or both sides by the transparent housing permeable to carbon monoxide. In another form of the invention, a glass plate is coated, with the reagent being confined to the plate by a housing that is permeable to carbon monoxide. In another form of the invention, a porous intermediate layer, preferably fiber glass, is inserted between the carbon monoxide permeable housing and the reagent.

According to another and a very simple form of the invention, the reagent is formed into tablets or pellets and enclosed in a bag or hose-like housing which is permeable to carbon monoxide and which is at least partially transparent. In this case, the housing can be in the form of a tube or ribbon separated into a plurality of separate compartments, each of which contains the reagent.

The means by which the objects of the invention are obtained are described more fully with reference to the accompanying drawing which is a cross-sectional view of a detecting device constructed according to this invention.

A glass plate 1 is coated with a reagent layer 2 having a composition hereinafter described. The reagent layer 2 is covered by a layer of fiber glass 3 which can have the shape of a cap or a hood. Fiber glass layer 3 is confined by a layer of synthetic film 4 which is supported by the fiber glass layer 3.

The above elements are confined within a rectangular or cylindrical housing 5 which forms a box having open opposite sides. One open side is, in effect, closed by the glass plate 1, while the other open side is covered by means of a wire mesh 6 serving to protect the film 4. Box 5 is provided with openings 7 in order to improve the circulation of air through the box.

More specifically, the gas detecting device is constructed according to the following example.

Glass plate 1 serving as a reagent carrier is first coated with a sticky film as, for example, a film that is made from a solution of polyisobutylene in gasoline or from a solution of polystyrene in benzene. The reagent per se is obtained as follows. A solution is made of 10 g. NaCl in 100 g. of water with the addition of 0.5 g. palladium-(II) chloride and 2 g. sodium acetate. Then 20 to 40 ccm. of this solution are sprinkled onto 100 g. of powdered and dust-like silica gel. Thus a powdered reagent is obtained which is dusted onto the sticky film coating the glass plate.

This coating layer 2 is then covered with the layer of fiber glass 3 which, in turn, is covered by a thin film of polystyrene approximately 0.02 mm. thick. The edges of the film 3 can be lapped over the edges of the plate 1 and glued thereto.

The glass plate is best observed from its exposed side not covered by the reagent, and for best reults, is hung on a wall in the area to be examined. It is only essential that the atmospheric air being tested comes into contact with the film layer 3.

Glass plate 1 can be curved, and it can be replaced by a transparent synthetic material.

Whenever dangerous concentrations of carbon monoxide of about 0.05 vol.-percent exist, such will be detected in a relatively short time. However, a low concentration of carbon monoxide as, for example, 100 p.p.m., which is not harmful to the health of people and will not cause a detectable reaction in the reagent, even though the absorption time is more than 200 hours.

If, on the other hand, the same reagent is exposed to the above concentrations of carbon monoxide without being covered by the film 4, then a discoloration takes place in the reaction at a carbon monoxide concentration of 0.05 vol.-percent in less than one hour. Moreover, if the uncovered reagent is exposed to the above-mentioned low concentrations of carbon monoxide (approximately 100 p.p.m.), then an indication takes place in less than twenty hours.

Accordingly, it clearly appears that upsetting and dangerous concentrations of carbon monoxide are detected with sufficient quickness; while on the other hand, very low and relatively harmless concentrations of carbon monoxide are neither detected or only detected after a very long period of time.

It is also clear that the rate of diffusion of carbon monoxide is so low that the thin layer of synthetic film 4 practically prevents the diffusion of carbon monoxide when such is present in very low concentrations. This effect of the protective layer 3 of this invention in preventing diffusion is most desirable.

In the above example, the gas detection was made at a temperature of 20° C. and a relative humidity of 80%. The humidity did not influence the activity of the reagent since the film of polystyrol that was used to cover the reagent is practically impermeable to water vapor.

According to another form of the invention, the reagent is placed in the form of a powder or grains and then poured into a bag or a tube composed of a film of polyethylene or polyvinylchloride. After being filled, the tube or bag was tightly closed. The reagent had a grain size of from about 2 to 5 mm. In this modification, the reagent indicates the presence of carbon monoxide in the same manner as heretofore described.

The reagent can also be placed into the form of tablets and used in the foregoing examples. This has the advantage in that the quantity of the reagent used can be determined quite accurately.

Such reagent tablets are wrapped in pieces of hose or bags made from a film of synthetic material.

The carbon monoxide permeable housing can be in the form of a string of separate compartments to enclose separate tablets or grains of reagent as is well known in the packaging of pharmaceuticals.

In so doing, two strips of synthetic film are joined in such a way as to form a plurality of separated compartments into each of which the powdered reagent or a reagent tablet is placed. This has the advantage in that the compartments can be separated by a string, one by one, as they are needed.

The housing can also take the form of a little bottle composed of a material permeable to carbon monoxide and closed with a screw top. The top can also serve as the fastening means for hanging the reagent bottle on a wall.

The carbon monoxide permeable protective layers or housings are chosen from materials having sufficient permeability. Synthetic materials especially suitable for this purpose are polyvinylchloride, polyethylene, polyacrylates or polyvinylidenechlorides.

It is desirable to use only such materials which are penetratable only by carbon monoxide and impermeable, as much as possible, to other reducible gases.

Having now described the means by which the objects of the invention are obtained, I claim:

A device for detecting the presence of carbon monoxide comprising a housing composed of a box having two open opposite sides, a transparent glass plate covering one open side, a coating of a carbon monoxide sensitive reagent on the surface of said plate facing interiorly of said box, a porous intermediate layer on said coating for confining said reagent to said plate, a film of synthetic material at least partially permeable to carbon monoxide and at least partially transparent covering said porous intermediate layer, and an air permeable closure member covering the other open side of said box.

References Cited in the file of this patent

UNITED STATES PATENTS

| | | |
|---|---|---|
| 1,644,014 | Gordon et al. | Oct. 4, 1927 |
| 1,891,429 | Ljunggren | Dec. 20, 1932 |
| 2,738,257 | Darby | Mar. 13, 1956 |
| 2,998,306 | Huyck et al. | Aug. 29, 1961 |
| 3,000,706 | Royce | Sept. 19, 1961 |